P. JOHANSON AND E. A. FRANCKE.
SHAPING DEVICE FOR ARTICLES MADE OF CERAMIC BONDED MATERIAL.
APPLICATION FILED AUG. 14, 1919.
1,376,773.
Patented May 3, 1921.
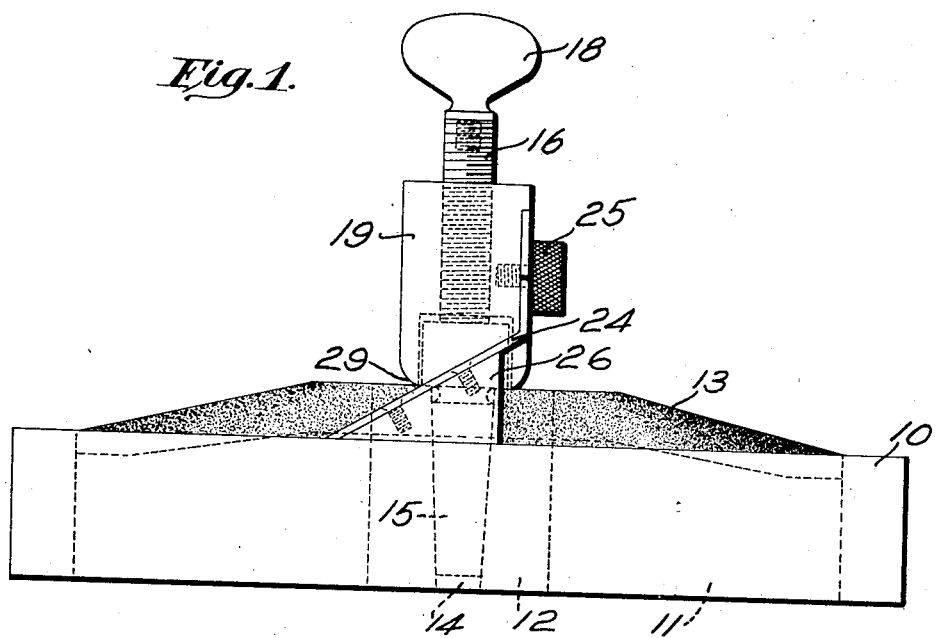
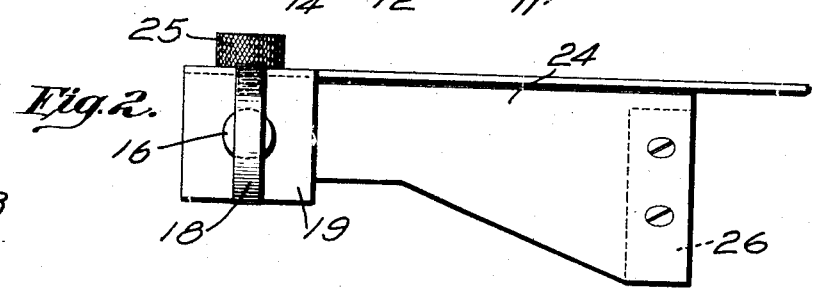
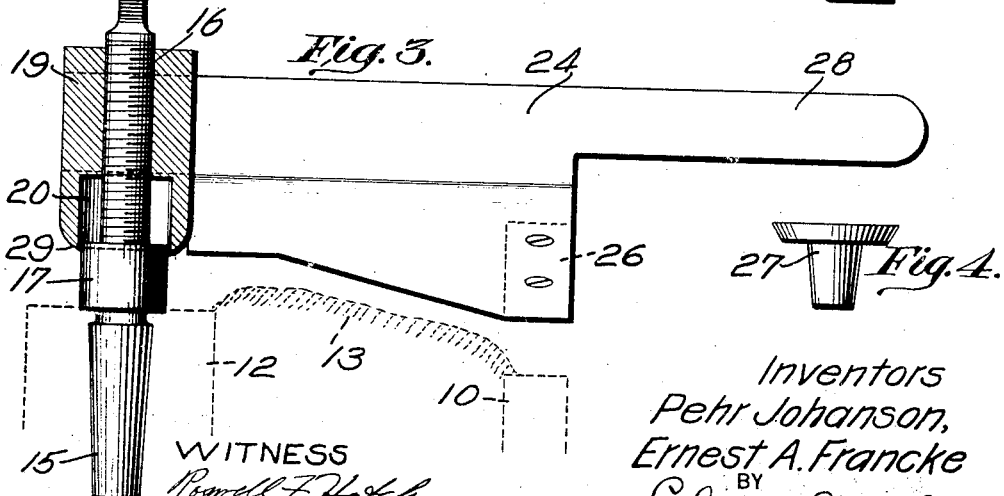
Inventors
Pehr Johanson,
Ernest A. Francke

UNITED STATES PATENT OFFICE.

PEHR JOHANSON AND ERNEST A. FRANCKE, OF WORCESTER, MASSACHUSETTS, ASSIGNORS TO NORTON COMPANY, OF WORCESTER, MASSACHUSETTS, A CORPORATION OF MASSACHUSETTS.

SHAPING DEVICE FOR ARTICLES MADE OF CERAMIC BONDED MATERIAL.

1,376,773.     Specification of Letters Patent.     Patented May 3, 1921.

Application filed August 14, 1919. Serial No. 317,604.

*To all whom it may concern:*

Be it known that we, PEHR JOHANSON and ERNEST A. FRANCKE, citizens of the United States of America, residing at Worcester, in the county of Worcester and State of Massachusetts, have invented certain new and useful Improvements in Shaping Devices for Articles Made of Ceramic Bonded Material, of which the following is a full, clear, and exact specification.

This invention relates to the manufacture of articles of ceramic bonded granular material, such as abrasive wheels, and more particularly to the tools used for forming or shaping ceramic articles before they are burned. Articles of this class are usually made by mixing loose particles of abrasive material, such as crystalline alumina or carbid of silicon, with some form of plastic binder, such as clay or silicate of soda, the mixture thus formed being then molded, either after drying or while in the moist or plastic condition, to the desired shape and size and thereafter hardened or set by the application of heat.

It is usual to form or shape the side of a circular ceramic object by the use of a tool called a shaving or finishing tool which is usually mounted to be rotated and thus to give form to the article. The shaving of these green ceramic objects must be carefully done in order that the perfection of form of the finished article may not be marred by breaking out pieces of the plastic composition or otherwise varying its true circular proportions.

The main object of the present invention is to provide a tool for shaving green ceramic bonded articles, as has been described, which will continuously shave away a thin layer of uniform thickness until the desired size and shape has been obtained and so produce work at an increased speed without digging in below the intended cutting outline and thus produce a smooth surface to the work.

To this end, the invention comprises a cutting blade or knife extending in an approximately radial direction and adapted to be rotated to shave off the surplus material. In order to prevent cracking and breaking out pieces of the finished surface of the work, means is provided for limiting the depth of cut taken by the knife at each rotation until the article has reached its approximate form. This is preferably carried into effect by causing the knife to feed toward the work under the control of a screw thread which limits the depth of cut for each rotation in accordance with the pitch of the thread and causes a uniform advance of the knife into the work for each rotation. After the work has reached its approximate final shape, the feeding movement of the knife is stopped, after which it may be rotated with little or no feeding movement to produce a smooth surface on the work. This is preferably done automatically so that the operator may cause the knife to advance first with a uniform feeding movement into the work and then, when the work has reached its approximate final shape, to rotate without any positive feeding movement and thus produce a smooth surface on the work.

One embodiment of the invention is illustrated in the accompanying drawing, in which:—

Figure 1 is an elevation of the tool as applied to one form of mold, showing the finished work therein;

Fig. 2 is a plan view of the cutting blade;

Fig. 3 is an elevation of the blade shown partly in section, its relation to the work at the beginning of the operation being indicated in dotted lines; and Fig. 4 is a detail view of a plug used prior to the application of the knife as will be hereinafter described.

The particular form of work-supporting device selected for the purpose of illustration is a mold used in the manufacture of abrasive wheels. This may comprise a circular mold band 10 which fits closely about the periphery of a bottom plate 11 (shown in dotted line). A center 12 is non-rotatably secured in the bottom plate and projects upward therefrom to the height of the finished wheel, forming the central opening therein. The wheel material indicated at 13 is placed in the mold and projects upward therefrom in a more or less irregular outline as indicated in dotted lines in Fig. 3.

The center 12 is provided with a tapered hole 14 which is adapted to receive a correspondingly tapered plug 15 formed on a screw-threaded stud 16. The stud is provided with an enlarged portion 17 which is so positioned that when the plug 15 has been forced into the hole 14 so as to be nonrotatably secured therein by frictional engagement, the enlarged portion will be nearly in contact with the upper surface of the center 12. The upper end of the stud may be provided, for convenience, with a thumb-nut 18 by which the tool may be inserted and removed from the work.

A screw-threaded block or nut 19 is mounted on the stud 16 and provided with a chamber 20 which loosely receives the enlarged portion 17 of the stud. A blade 24 is rigidly secured in a recess in the nut 19 by a thumb-screw 25 so that it extends in a generally radial direction. The blade is bent, as is clearly shown in the drawing, and shaped on its lower cutting edge so as to produce the desired configuration of the wheel when it is rotated thereon. In order that the blade may not be worn too rapidly by contact with the mold band 10, it is preferably provided with a block 26 which is attached to the blade by screws as illustrated.

In the use of my invention, the green ceramic article is prepared by any usual method to bring it into proper condition to be shaped. As illustrated, the wheel material would be first placed in the mold so as to project above the final outline of the wheel, leaving a surplus portion to be trimmed off. In order that the hole 14 in the center 12 may not become obstructed by loose material, a plug 27, illustrated in Fig. 4, is provided to close the opening in the center while the material is being placed in the mold. After the material has been placed in its proper position, the plug is removed, leaving a clean hole in which to insert the stud 16. Before inserting the stud, the nut 19 is turned toward the upper end into the position shown approximately in Fig. 3. The tapered plug 15 is then forced into the hole in the opening which positions the blade above the general outline of the material, as illustrated in Fig. 3, for cutting a surface of revolution about the wheel axis. The operator now rotates the blade by means of the projecting handle 28 as many times as may be necessary in order to shave the wheel. As the stud 16 is held by frictional engagement in the center 12, the first rotations of the blade cause it to travel down in accordance with the pitch of the thread, thereby taking a uniform shaving from the top of the wheel material of a thickness equal to the pitch of the thread. After the nut has been turned down so that the bottom portion engages the center 12 and the block 26 rests upon the mold band 10, further rotation of the blade causes the plug 15 to be pulled out of the center 12 until it is free to rotate therein, after which it will turn with the nut. The engagement of the nut 19 and the center 12 determines the limit of downward movement of the blade and, in order that this may not be varied by loose material encountered between the bottom of the nut and the top of the center, the bottom of the nut is preferably rounded off as shown at 29 so as to present substantially a knife edge which will not rest upon abrasive grains or other material which may be scattered on the center. After the plug 15 has been loosened from the center enough to permit it to turn therein, the rotation of the blade may be continued a few turns to remove slight projecting particles of wheel material and to smooth over the surface of the work. It will be apparent that the operator may turn the blade as rapidly as may be desired, but he will be unable to cause the blade to bite into the material and tear out large particles which would cause indentations in the finished surface of the wheel. The change from a downward feeding movement of the blade to the rotary movement to finish off the surface of the work is automatically accomplished without attention on the part of the operator and will unfailingly take place at the same point each time thereby insuring a product of uniform thickness.

This invention has been described in connection with a particular form of mold for use in making abrasive wheels, but it is to be understood that the invention is not limited to use in this connection but it may be applied within the skill of an ordinary mechanic to shaping or finishing various green ceramic articles without departing from the spirit of the invention as defined in the following claims. Various terms have been employed in the description and in the claims for denoting direction of movement but it is to be understood that these terms are not expressive of any characteristic feature of the invention, as it is the relative movement alone which is of importance.

Having described the preferred form of my invention, what is claimed as new, is:

1. A device for shaping articles of ceramic bonded material, comprising a support having a projecting center to form a center hole in the article, a blade rotatably mounted on said device, and means for causing the blade while rotating to move bodily toward the work to a predetermined extent and thereafter to freely rotate without substantial movement toward the work.

2. A device for shaping articles of ceramic bonded material, comprising a support having a projecting center to form a center hole in the article, a blade rotatably mounted on said center, and means for causing the blade while rotating to move toward the work at a uniform rate and to a predetermined extent and thereafter to be freely rotated without substantial movement toward the work.

3. A device for shaping articles of ceramic bonded material, comprising a mold having a projecting center to form a center hole in the article, a stud carried by said center, a blade pivotally mounted on the stud, and means actuated by rotation of the blade to cause it to move toward the work at a uniform rate and thereafter render said blade moving means inoperative.

4. A device for shaping articles of ceramic bonded material, comprising a mold having a projecting center to form a center hole in the article, a threaded stud supported on said center, a blade pivoted on said stud, and connections between the stud and center whereby the stud first remains stationary while the blade is rotated on the thread and then rotates with the blade.

5. A device for shaping articles of ceramic bonded material, comprising a mold having a projecting center to form a center hole in the article, a screw-threaded stud held by friction from rotation in said center, a nut on said stud, a generally radially extending blade carried by the nut, and means for releasing the frictional engagement between the center and stud after a predetermined number of rotations of the nut and blade.

6. In a device for shaping ceramic bonded articles, the combination of a support for the article having a tapered hole, a stud provided with a threaded portion and a plug adapted to be frictionally held in the hole, a nut engaging the threaded portion of the stud, and a shaping blade movable with the nut as it traverses the thread, the arrangement being such that engagement between the nut and the support releases the frictional engagement between the stud and the support thereby permitting the stud to turn with the nut.

7. In a device for shaping ceramic bonded articles, the combination of a screw-threaded stud, a nut engaging the screw thread, a blade carried by the nut, means for holding the stud from rotation with the nut, and means actuated by the travel of the nut on the stud for rendering said holding means inoperative whereby the stud will rotate with the nut.

8. In a device for shaping ceramic bonded articles, the combination of means for supporting the article to be shaped, a threaded stud frictionally held in the support, a blade mounted to travel toward the work on the thread upon rotation and means for releasing the frictional engagement between the stud and the support whereby the threaded stud is permitted to turn with the blade.

9. In a device for shaping annular ceramic bonded articles, the combination of a stud centrally positioned in the opening of the article, a blade extending substantially in a radial direction from the stud and having a screw thread operatively connected therewith for feeding the blade toward the article, and means rendered effective by the relative position of the blade and one of the screw threaded members for rendering said screw thread inoperative.

10. In a device for shaping annular ceramic bonded articles, the combination of a fixed center member in the opening of the article, a screw threaded stud non-rotatably secured in the center member, a blade mounted to coöperate with the screw thread and means actuated by engagement of a part movable with the blade and the center member for releasing the non-rotatable engagement of the stud and the center member.

Signed at Worcester, Massachusetts, this 13th day of August, 1919.

PEHR JOHANSON.
ERNEST A. FRANCKE.